United States Patent
Goto et al.

[11] 3,902,037
[45] Aug. 26, 1975

[54] DC ARC WELDING APPARATUS BY HIGH-FREQUENCY PULSE CURRENT

[75] Inventors: Toru Goto, Kasugai; Yukio Kajino, Nagoya, both of Japan

[73] Assignee: Mitsubishi Kenki Kabushiki Kaisha, Tokyo, Japan

[22] Filed: Mar. 8, 1974

[21] Appl. No.: 449,337

[30] Foreign Application Priority Data
Mar. 12, 1973 Japan............................. 48-28745

[52] U.S. Cl............................. 219/135; 219/131 R
[51] Int. Cl................................................ B23k 9/10
[58] Field of Search..... 219/131 F, 131 R, 131 WR, 219/135, 69 P, 69 C; 315/172

[56] References Cited
UNITED STATES PATENTS

| | | | |
|---|---|---|---|
| 3,249,735 | 5/1966 | Needham | 219/131 R |
| 3,528,100 | 9/1970 | Budy | 219/131 R |
| 3,598,954 | 8/1971 | Iceland et al. | 219/131 R |
| 3,604,885 | 9/1971 | Inoue | 219/69 P |
| 3,728,515 | 4/1973 | Gedgaudas | 219/135 X |
| 3,775,585 | 11/1973 | Okada | 219/135 |

*Primary Examiner*—J. V. Truhe
*Assistant Examiner*—Clifford C. Shaw
*Attorney, Agent, or Firm*—Oblon, Fisher, Spivak, McClelland & Maier

[57] ABSTRACT

A DC Arc welding apparatus using a high-frequency pulse current, especially higher than 1 KHz, includes a first switching element connected in parallel to an arc load between an electrode and a workpiece for welding and a second switching element connected in series to the arc load whereby both of the switching elements are operated in conjugation so as to provide fast lift-up and fall-down of the high-frequency pulse current and wherein the difference between the maximum peak value (crest value) and the minimum peak value is increased to improve the welding effect.

6 Claims, 9 Drawing Figures

PATENTED AUG 26 1975

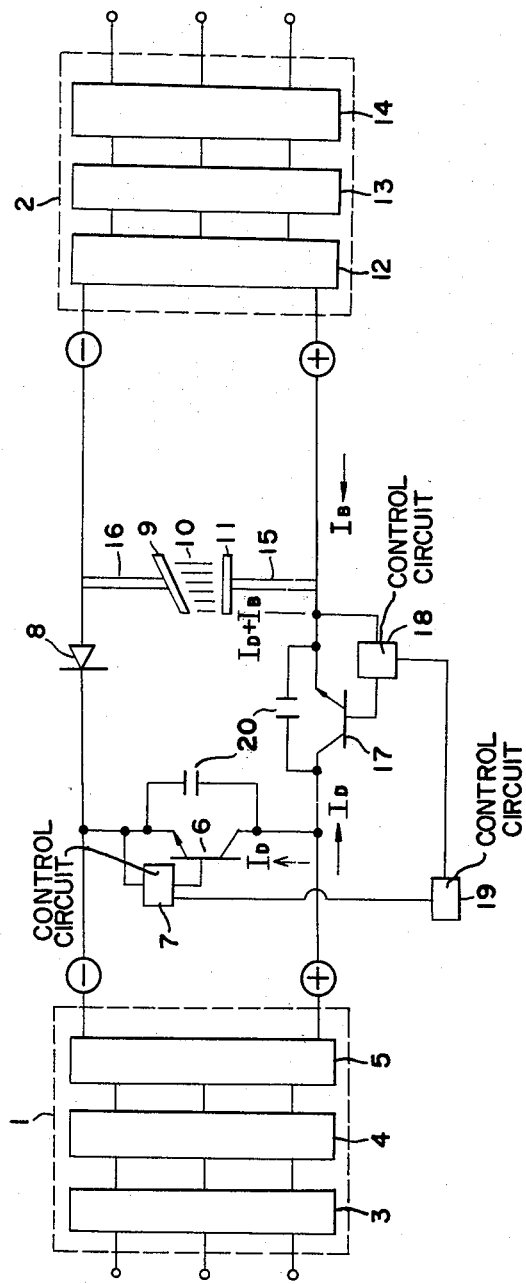
FIG. 3
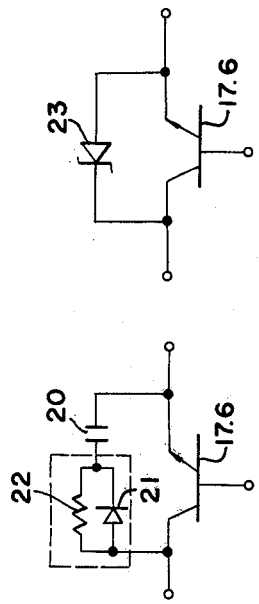
FIG. 5
FIG. 6
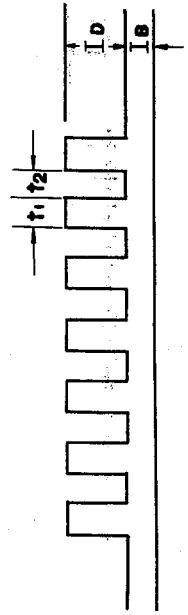
FIG. 4

DC ARC WELDING APPARATUS BY HIGH-FREQUENCY PULSE CURRENT

BACKGROUND OF THE INVENTION:

1. Field of the Invention:

This invention generally relates to an improvement of a DC Arc welding apparatus by using a high-frequency pulse current especially larger than 1 KHz.

2. Description of the Prior Art:

In general, in a non-electrode-consumption type arc welding method, such as the Tungsten Inert Gas welding method and the Plasma arc welding method, when a high-frequency pulse current having 1 KHz – 100 KHz is used, the fluctuation of arc pressure to a molten metal is sped up in comparison with the case of an application of a non-pulse DC current or a DC current having a frequency of less than 1 KHz. Accordingly the fluidity of the molten metal is improved and a fine beat is rapidly formed. A stirring operation of the molten metal is activated, blowholes are easily escaped to the atmosphere and the crystalline particles become fine to improve the welding strength. The improvement of the welding strength is especially remarkable in a welding of an aluminum alloy. Hardness of the arc increases by an increase of an electromagnetic self-contracting force at the time of increasing to the peak value of the pulse current, whereby the arc becomes stable and a fluctuation of the arc can be prevented even though consumption or deformation of a tungsten electrode occurs. Accordingly, the welding efficiency can be increased by both an improvement of the welding speed and decrease of exchange of the electrode.

The improved welding effect by the high-frequency pulse current is remarkable depending upon increase of the pulse frequency and increase of the maximum peak value of the pulse current in the same mean current.

In practicality, it is necessary to use a frequency higher than 1 KHz however, when the frequency is between 1 – 10 KHz a disagreeable metallic noise is generated from the arc and a noise pollution problem in the working environment occurs. Accordingly, it is necessary to use a frequency of higher than 10 KHz so as to reduce the effect of noise.

In the conventional pulse current generator, the difference between the maximum peak value and the minimum peak value of the pulse current is small, whereby a current waveform of smooth DC current including a slight pulse current occurs such that the self-contracting force of arc is decreased and also a high speed vibration of the molten metal by the arc pressure which is caused by the fluctuation current, is decreased. Accordingly, with such a conventional pulse current generator the desired improved welding effect of the high-frequency pulse current cannot be realized.

This problem is illustrated with particular reference to FIGS. 1 and 2 which show a conventional apparatus. In FIG. 1, the reference numeral 1 designates a DC main power source which consists of a three-phase transformer 3, a three-phase reactor 4 for providing a drooping characteristic to a DC main current $I_D$ and a three-phase full wave- rectifying circuit 5, whereby the DC main current $I_D$ which is substantially smooth and has a drooping characteristic is generated.

A workpiece 11 for welding is connected through an arc cable 15 to the positive output of the DC main power source 1. An electrode 9 is connected through a diode 8 and a torch cable 16 to the negative output of the DC main power source 1. It should be understood that it is possible to use a three-phase leakage transformer instead of the three-phase transformer 3 and the three-phase reactor 4 of the DC main power source 1. The reference numeral 6 designates a switching element, e.g., a transistor. A collector of the transistor 6 is connected to the positive output of the DC main power source 1 and the emitter of the transistor 6 is connected to the negative output of the DC main power source. The reference numeral 7 designates a control circuit for the transistor 6. The turn-on period and the turn-off period of the transistor 6 can be controlled by adjusting the control circuit.

The reference numeral 2 designates a DC base current power source circuit which consists of a three-phase transformer 14, a three-phase reactor 13 and a three-phase fullwave rectifying circuit 12. A DC base current $I_B$ which is substantially smooth and has a drooping characteristic is normally fed from the circuit 2 to the ground cable 15 to maintain the arc.

The output current $I_D$ of the DC main power source 1 is passed to the arc 10 when the transistor 6 is turned off, while it is passed to the transistor 6 when the transistor 6 is turned on. In either case, the DC base current $I_B$ is not passed to the transistor 6, since it is blocked by the diode 8, even though the transistor 6 is turned on. Accordingly the DC base current $I_B$ is normally passed only to the arc 10 regardless of the turn-on or turn-off of the transistor 6. When the turn-off period $t_1$ and the turn-on period $t_2$ of the transistor 6 are set, the arc 10 passes a pulse current having the frequency $$f = 1/t_1 + t_2$$

wherein $t_1$ represents the period for passing current having the peak value of $I_D + I_B$ and $t_2$ represents the period for passing current having the peak value of $I_B$. Even though the DC base current $I_B$ is zero, if the turn-on period $t_2$ is quite short and the transistor 6 is turned off before the remaining plasma disappears, then reignition of the arc is easily made so that the DC base current power source 2 can be omitted. The turn-on period $t_2$ of the transistor is less than 1 milli-second when the frequency is higher than 1 KHz. The residual period of the plasma of the arc in the atmosphere is in a range of 1 milli-second to 100 $\mu$second. Accordingly, the DC base current power source 2 can be omitted in most cases. Of course, the diode 8 can be omitted. When the transistor 6 is turned on, the main current $I_D$ passing to the arc 10 rapidly attenuates to change the current passing to the transistor 6. The attenuation period is dependent upon a circulating current $I_C$ caused by discharging the energy in the inductance, e.g., the ground cable 15, the torch cable 16, etc., to the diode 8, the transistor 6 and the arc 10. The direction of the circulating current $I_C$ is such as to delay the attenuation of the main current $I_D$ so that the attenuation of main current $I_D$ is slowed down by the circulating current $I_C$. The attenuation time constant T of the main current $I_D$ is substantially equal to the time constant of the loop circuit and is about 100 $\mu$second. It is hard to decrease the time constant much lower than 100 $\mu$second in view of the structure of the circuit. If the pulse frequency is low and the turn-on period $t_2$ of the transistor 6 is much longer than the attenuation time constant T of the main current $I_D$, the attenuation time constant T of the loop circuit can be negligible. However, the turn-on period $t_2$ is less than 1 milli-second in the frequency of higher than 1 KHz and is less than 100 $\mu$second in the frequency of higher than 10 KHz. Accordingly, the attenuation time constant T of the loop circuit cannot be neglected. The transistor 6 is turned off when not enough attenuation is given after the initiation of the attenuation of the main current $I_D$ passing the arc 10 by the turn-on of the transistor 6. The difference between the maximum peak value and the minimum peak value of the pulse current is small as shown by the waveform with the full line of FIG. 2. Accordingly, an improved welding effect cannot be expected.

SUMMARY OF THE INVENTION:

Accordingly it is an object of the present invention to provide a new improved unique DC arc welding apparatus using a high-frequency pulse current wherein the difference between the maximum peak value and the minimum peak value of the pulse current is high.

Briefly, in accordance with the present invention the foregoing and other objects are in one aspect attained by the provision of a DC arc welding apparatus using a high-frequency pulse current which comprises a first switching element connected to an output of a DC power source in parallel to the arc load between an electrode and a workpiece for welding; and a second switching element connected in series to the arc load in the arc load side opposite from the first switching element, whereby both of the switching elements are operated in conjugation and fast lift-up and fall-down of the pulse current is imparted to increase the welding effect. The DC arc welding apparatus of the invention includes a negative feedback circuit which controls the mean value of the arc current to be constant by controlling the turn-off period or the turn-on period of the first and the second switching elements by detecting the arc current whereby the input of heat to the workpiece is kept constant against fluctuations due to a primary voltage an arc length, etc., to thereby increase the welding effect.

BRIEF DESCRIPTION OF THE DRAWINGS:

The foregoing and other objects will be more fully understood when considered in connection with the accompanying drawings wherein:

FIG. 1 is a schematic diagram of a conventional DC arc welding apparatus using a high-frequency pulse current.

FIG. 2 is a graph showing an operation of the apparatus of FIG. 1.

FIG. 3 is a schematic diagram of one preferred embodiment of the DC arc welding apparatus using a high-frequency pulse current according to this invention.

FIG. 4 is a graph for illustrating the operation of the apparatus of FIG. 3.

FIGS. 5 and 6 are respectively schematic diagrams of embodiments of a surge absorber of a switching element for use with the invention.

Figure 7:
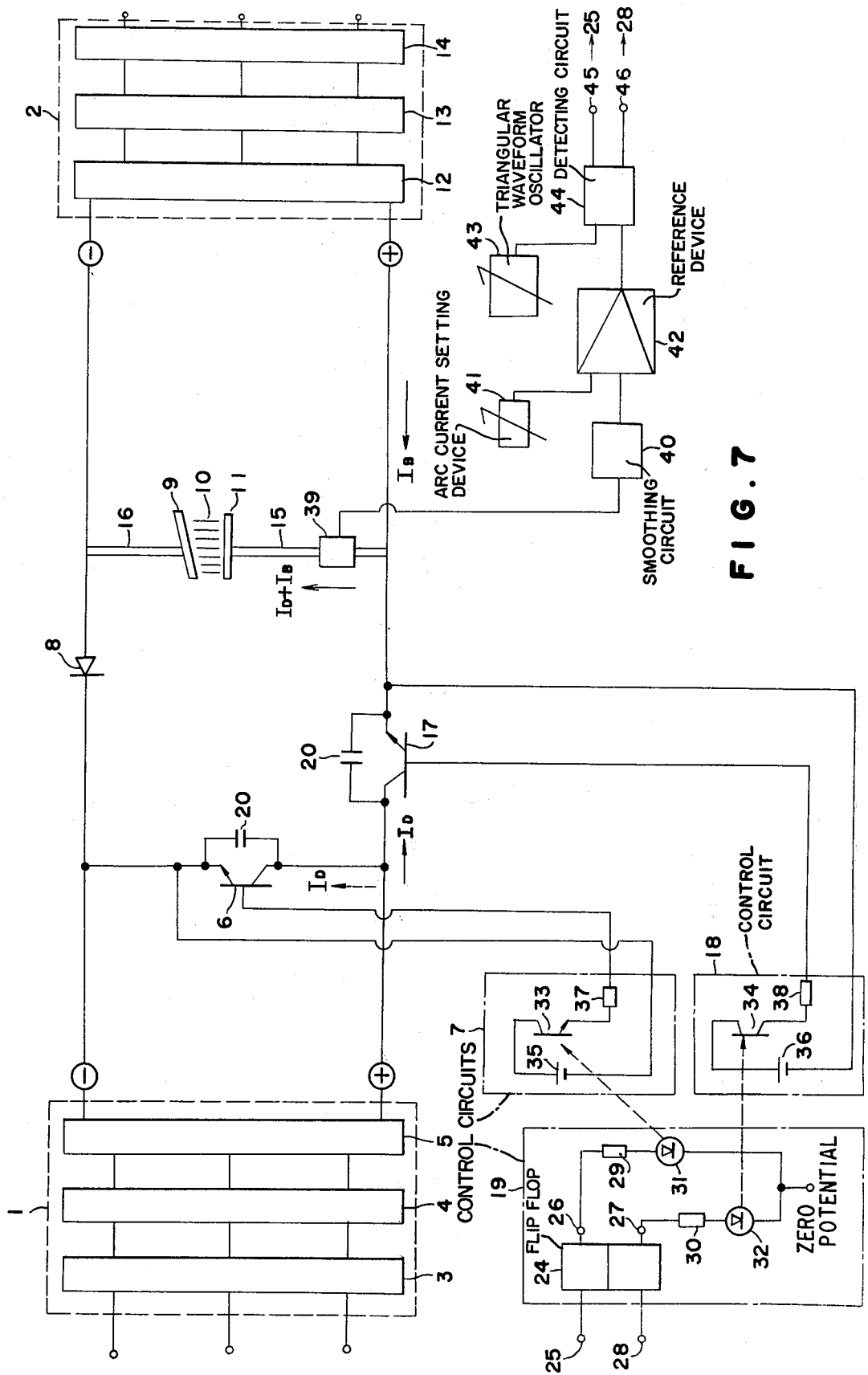
FIG. 7 is a schematic diagram of a preferred embodiment of the DC arc welding apparatus using a high-frequency pulse current according to the present invention and is a detail of the apparatus of FIG. 3; and, FIGS. 8 and 9 are respectively graphs for illustrating the operation of the apparatus of FIG. 7.

DESCRIPTION OF THE PREFERRED EMBODIMENTS:

Referring now to the drawings wherein like reference numbers refer to or designate identical or corresponding parts throughout the several views and more particularly to FIG. 3 thereof wherein one preferred embodiment of the present invention is illustrated. In FIG. 3, the structure of elements 1 – 16 are the same as those of the conventional apparatus illustrated with reference to FIG. 1. The novel feature of the present embodiment is to insert a transistor 17 between the collector side of the transistor 6 and the ground cable 15, and to include a control circuit 18 for a transistor 17. The switching element 18 for preventing a circulating current is connected in series to the arc 10 to instantaneously attenuate the main current $I_D$ whereby the difference between the maximum peak value and the minimum peak value is high enough even though the high-frequency pulse current is higher than 10 KHz. A control circuit 19 simultaneously controls the transistor 6 and the transistor 17. When the transistor 6 is turned off by the control 19 circuit, the transistor 17 is turned on. When the transistor 6 is turned on, the transistor 17 is turned off, so that both of the transistors are operated in conjugation.

In accordance with the apparatus of FIG. 3, the transistor 17 is turned off just after turning on of the transistor 6, so that the circulating current is broken and the main current $I_D$ rapidly attenuates to provide a high-frequency pulse current having a large difference between the maximum peak value and the minimum peak value as shown in FIG. 4. When the transistor 17 or 6 is turned off, a condenser 20 connected between the emitter and the collector of the transistor 17 or 6, absorbs the surge voltage generated between the emitter and the collector so as to protect the transistor 17 or 6.

The energy charged on the condenser 20 is discharged when the transistor 17 or 6 is turned on in the next time. Accordingly, when a diode 21 and a resistor 22 are connected in parallel between the collector of the transistor 17 or 6 and the condenser 20 as shown by the dotted line of FIG. 5, the surge voltage in the turn-off of the transistor 17 or 6 is rapidly charged to the condenser 20 through the diode 21. The discharge in the turn-on of the transistor 17 or 6 is performed through the resistor 22. Accordingly the energy loss of the transistor 17 or 6 in the discharge can be decreased advantageously in a practical operation.

It is possible to use a constant voltage type surge absorber 23 such as a zener diode or a constant voltage surge absorption circuit having a zener diode as shown in FIG. 6, instead of the condenser 20 shown in FIGS. 3 and 5.

When the transistor 17 is inserted between the diode 8 and the emitter of the transistor 6, the emitter of both of the transistors are of a common potential level so that design is simple. The details of the structure and the operation of the control circuits 7, 18, and 19 are illustrated referring to the circuit of FIG. 7. In the control circuit 19 shown by the dotted chain line, the reference numeral 24 designates a flip-flop circuit. When a pulse input is applied to the input terminal 25, a constant signal having a level at the output terminal 26 and a low level at the output terminal 27 is continuously generated. On the other hand, when a pulse input is applied to the input terminal 28, a constant signal having a low level at the output terminal 26 and a high level at the output terminal 27 is continuously generated. The terminals 26, 27 are respectively connected through current limit resistors 29, 30 and light emitting diodes 31, 32 to a zero potential portion of the power source of the control circuit 19. Accordingly, when the output terminal 26 is at a high level by applying an input pulse to the input terminal 25, the light emitting diode 31 is ignited. On the contrary, when the output terminal 27 is at a high level by applying an input pulse to the input terminal 28, the light emitting diode 32 is ignited. Phototransistors 33 and 34 of the control circuits 7 and 18 are optically connected so as to turn-on by a photo-signal from the light emitting diodes 31, 32 respectively. The DC power sources 35 and 36 are respectively power sources of the control circuits 7 and 18, and the current limit resistors 37 and 38 are connected.

When a pulse input is applied to the input terminal 25, the flip-flop circuit 24 is operated to provide a high level at the output terminal 26 whereby the light emitting diode 31 is ignited to turn-on the photo-transistor 33 and the transistor 6 is turned on by passing the current from the DC power source 35 through the phototransistor 33, the current limit resistor 37, and the base of the transistor 6 and its emitter. On the other hand, the output terminal 27 is at a low level, the diode 32 is not ignited and the phototransistor 34 is kept turned-off and the transistor 17 is also kept turned-off. The arc current is only $I_B$. On the other hand, when a pulse input is applied to the input terminal 28, the opposite condition occurs so that the transistor 6 is kept turned-off, and the transistor 17 is turned on. The arc current is therefore $I_D + I_B$.

As stated above, it should now be apparent that with the present invention when the first switching element is connected in parallel to the arc load and the second switching element for preventing the ring or circular current is connected in series to the arc load, so as to operate both of the switching elements in conjugation, it is possible to obtain a high-frequency pulse current having a fast lift-up and fall-down and a large difference between the maximum peak value and the minimum peak value for frequencies higher than 1 KHz. It is clear that a similar effect can be obtained by changing the impedances of both of the switching elements in conjugation by connecting variable impedance elements instead of the switching elements. In accordance with this invention, a hard stable arc can be imparted, and high speed vibration of a molten metal is obtained by high speed vibration of the arc pressure at a rate of higher than 1000 cycles per second by applying a signal at a frequency of higher than 1 KHz. As such an increase of the welding speed, an increase of operation efficiency by decrease of exchanges of the electrodes, a decrease of blow-holes in the molten metal, and fine crystalline particles to impart a high quality welded part are readily provided. Moreover, with the present invention, when a frequency of higher than 10 KHz is applied, a working environment with less noise affect can be provided.

When the negative feedback circuit for controlling the mean value of the arc current to be constant by controlling the turn-off period $t_1$ or the turn-on period $t_2$ of the transistor 6, by detecting the mean value of the arc current, is added in the apparatus of the invention shown in FIG. 3, the input of heat to the workpiece is kept constant against fluctuations of the primary voltage and the arc length etc., whereby the improved welding effect can be further increased by the synergistical effect of the DC constant current control effect and the arc hardening and stabilizing effect by the high-frequency pulse current. For example, in the Tungsten Inert gas welding method for a but-welding of a thin plate having a thickness of about 0.3 - 3.0 mm, when the high-frequency pulse power source having the negative feedback circuit is provided for controlling the mean value of the arc current to be constant, the welding speed can by increased by several times in comparison with the case of using a high-frequency pulse power source having no-negative feedback circuit or a smooth DC power source having a negative feedback circuit.

With the present invention the synergistical effect of the constant current control effect by the negative feedback circuit and the arc hardening and stabilizing effect by the high-frequency pulse current can be remarkably imparted.

The negative feedback circuit is illustrated with reference to FIG. 7 wherein the structure of the elements 1 – 38 are the same as those of FIG. 3. In FIG. 7, the reference numeral 39 designates a shunt for detecting current, which is inserted in series to the arc 10; 40 designates a smoothing circuit at the output of the shunt; 41 designates an arc current setting device for generating a signal corresponding to a predetermined value; and 42 designates a reference device which compares the signal of the arc current setting device 41 and the signal proportional to the arc current passed through the shunt 39 and the smoothing circuit 40, to provide an error signal at its output. The reference numeral 43 designates a triangular waveform oscillator for providing a triangular waveform having a constant amplitude of a desirable frequency; 44 designates a correspondency circuit which detects the correspondency of the triangular waveform signal from the triangular waveform oscillator 43 and the error signal from the reference device, whereby a pulse signal is transmitted from the output terminal 45 at the corresponding point in the fall-down of the triangular waveform and from the output terminal 46 at the corresponding point in the lift-up of the triangular waveform. The output terminals 45, 46 are respectively connected to the input terminals 25, 28 of the control circuit 19. When the arc current increases from the predetermined value, the error output of the reference device 42 increases in a positive direction, while when the arc current decreases from the predetermined value, the error output of the reference device 42 increases in a negative direction.

Figure 9:
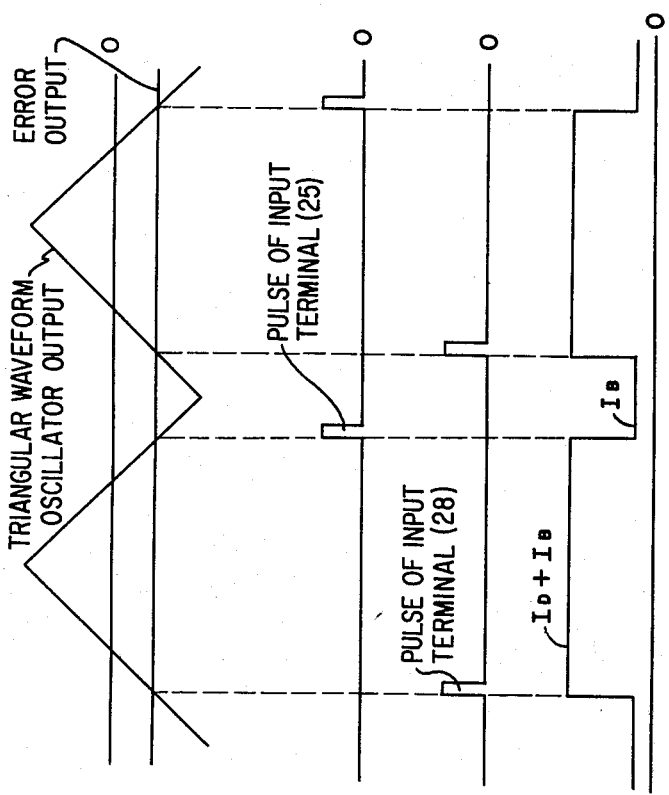
Figure 8:
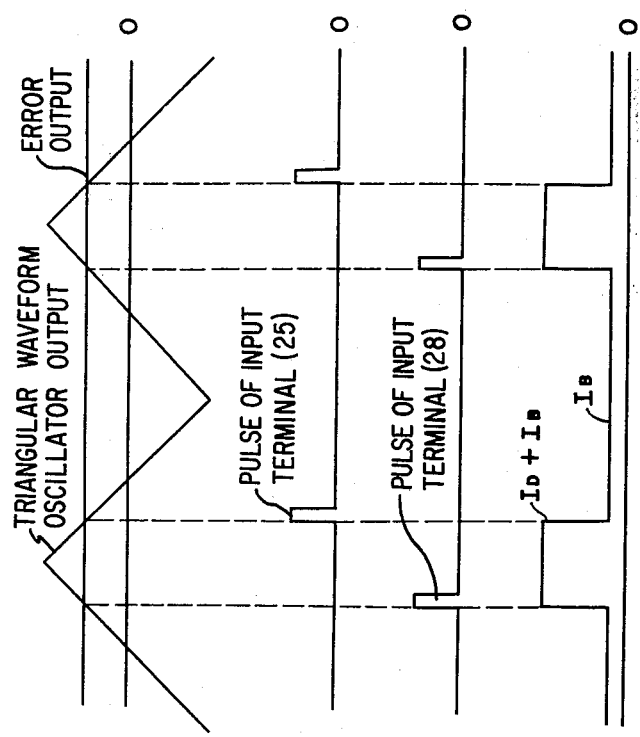

FIG. 8 shows the condition in the case of an arc current higher than the predetermined value and FIG. 9 shows the condition in the case of an arc current lower than the predetermined value. As is clear from the graphs of FIGS. 8 and 9, the transistor 6 is kept turned-off and the transistor 17 is turned-on and the arc current is $I_D + I_B$ during the period from applying the input pulse to the input terminal 28 of FIG. 7 to applying the input pulse to the input terminal 25. On the contrary, the transistor 6 is turned-on and the transistor 17 is kept turned-off and the arc current is only $I_B$ during the period from applying the input pulse to the input terminal 25 to applying the input pulse to the input terminal 28. If the arc current increases over the predetermined value and the error output of the reference device 42 increases in a positive direction by a certain factor, then the period for passing the arc current $I_D + I_B$ decreases as shown in FIG. 8. If the arc current decreases below the predetermined value and the error output of the reference device 42 increases in a negative direction by a certain factor, then the period for passing the arc current $I_D + I_B$ increases as shown in FIG. 9. Accordingly, the arc current keeps a constant mean value corresponding to the predetermined value of the reference device 41. The improved welding effect can be further increased by the constant current control effect of the negative feedback circuit.

It should now be apparent that a unique and improved non-electrode consumption type arc welding has been illustrated. However, even though the invention as described is applied for the electrode consumption type arc welding such as the Metal Inert Gas welding method, it is possible to impart high quality welding by a decrease of blow-holes and the fine crystalline particles, and to improve the welding efficiency by the smooth movement of the electrode to the workpiece by the hard arc. However, in the case of the electrode consumption type arc welding, the arc length is easily changed even though the feed speed of the electrode is constant. Accordingly, it is preferable to use a DC power source having constant voltage characteristics which has a tendency to keep the arc length constant, that is an arc self-control characteristic, instead of the DC main power source 1 of FIG. 3. In the case of electrode consumption type arc welding, it is preferable to provide positive polarity to the electrode and to provide negative polarity to the workpiece, as a electrode consumption type arc welding by the smooth DC current.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A DC arc welding apparatus using a high frequency pulse current comprising:
    a DC power source,
    an electrode,
    a workpiece disposed opposite to said electrode to form an arc therebetween,
    a first switching element;
    a first control circuit to control the first switching element;
    a second switching element;
    a second control circuit to control the second switching element;
    a third control circuit to control the first and second control circuits;
    means connecting the first switching element in parallel with the DC power source,
    means connecting the first control circuit to the first switching circuit to turn the first switching circuit on and off,
    means connecting the second switching element, the electrode and the workpiece in a series circuit;
    means connecting the series circuit in parallel with the DC power source,
    means connecting the second control circuit to the second switching circuit to turn the second switching circuit on and off;
    means connecting the third control circuit to the first control circuit and the second control circuit;
    the third control circuit comprising means to turn on the first switching element through the first control circuit while it turns off the second switching element through the second control circuit, means to turn on the second switching element through the second control circuit while it turns off the first switching element through the first control circuit;
    whereby a large difference is obtained between the maximum peak value and the minimum peak value of the high frequency pulse current between the electrode and the workpiece.

2. A DC arc welding apparatus using a high frequency pulse current in accordance with claim 1 further comprising:
    a DC base current circuit connected to the electrode and workpiece to maintain the arc between the electrode and the workpiece irrespective of the position of the first and second switching elements.

3. A DC arc welding apparatus using a high frequency pulse current in accordance with claim 1 wherein the first switching element is a transistor and the second switching element is a transistor.

4. A DC arc welding apparatus using a high frequency pulse current in accordance with claim 1 further comprising a first surge absorber connected in parallel with the first switching element and a second surge absorber connected in parallel with the second switching element.

5. A DC arc welding apparatus using a high frequency pulse current in accordance with claim 1 further comprising a negative feedback circuit connected to the third control circuit to maintain constant the mean value of the arc current by detecting the arc current, comparing the arc current with a predetermined value, and controlling the turn on and turn off of the first and second switching elements in accordance therewith.

6. A DC arc welding apparatus using a high frequency pulse current in accordance with claim 2 further comprising a diode connected between the first switching element and the electrode for blocking current from the DC base circuit.

* * * * *

UNITED STATES PATENT AND TRADEMARK OFFICE
CERTIFICATE OF CORRECTION

PATENT NO. : 3,902,037
DATED : August 26, 1975
INVENTOR(S) : Toru Goto and Yukio Kajino It is certified that error appears in the above-identified patent and that said Letters Patent are hereby corrected as shown below:

Item [73], change Assignee from "Mitsubishi Kenki Kabushiki Kaisha" to --Mitsubishi Denki Kabushiki Kaisha--.

Signed and Sealed this third Day of February 1976

[SEAL]

Attest:

RUTH C. MASON
*Attesting Officer*

C. MARSHALL DANN
*Commissioner of Patents and Trademarks*